United States Patent
Nishida et al.

(10) Patent No.: US 10,853,538 B2
(45) Date of Patent: Dec. 1, 2020

(54) MODEL GENERATION SYSTEM AND MODEL GENERATION METHOD

(71) Applicant: Kabushiki Kaisha Toshiba, Minato-ku (JP)

(72) Inventors: Yukihito Nishida, Yokohama (JP); Akira Soga, Kita (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 407 days.

(21) Appl. No.: 15/923,397

(22) Filed: Mar. 16, 2018

(65) Prior Publication Data

US 2018/0285495 A1    Oct. 4, 2018

(30) Foreign Application Priority Data

Mar. 29, 2017  (JP) ................... 2017-064333
Dec. 26, 2017  (JP) ................... 2017-249763

(51) Int. Cl.
*G06F 30/20*     (2020.01)
*G06F 111/10*    (2020.01)

(52) U.S. Cl.
CPC .......... *G06F 30/20* (2020.01); *G06F 2111/10* (2020.01)

(58) Field of Classification Search
None
See application file for complete search history.

(56) References Cited

U.S. PATENT DOCUMENTS

2016/0260018 A1    9/2016    Ogawa et al.

FOREIGN PATENT DOCUMENTS

| JP | 07-093284   | 4/1995 |
| JP | 9-167152 A  | 6/1997 |
| JP | 2002-268703 | 9/2002 |
| JP | 2004-086896 | 3/2004 |

(Continued)

OTHER PUBLICATIONS

Uchimaru, Taku et al., "Nearest Correlation Louvain Method for Fast and Good Selection of Input Variables of Statistical Model", 2015, IFAC (International Federation of Automatic Control), Elsevier, Ltd. (Year: 2015).*

(Continued)

*Primary Examiner* — Cedric Johnson
(74) *Attorney, Agent, or Firm* — Oblon, McClelland, Maier & Neustadt, L.L.P.

(57) ABSTRACT

According to one embodiment, a model generation system includes a NCLM processor, a filter part, a model generator, a variable narrow-down part, a determiner, and a soundness calculator. The NCLM processor and the filter part narrows down a first input variable group to a third input variable group selected using NCLM. The model generator generates a model of a relationship between the third input variable group and an output variable. The variable narrow-down part narrows down the first input variable group to one or more of the input variables not used in the generation of the model. When the number of the models has not reached the specified number, the determiner outputting to the NCLM processor the first input variable group narrowed down by the variable narrow-down part. The soundness calculator calculates an overall soundness of the models and calculating a soundness of each of the models.

6 Claims, 20 Drawing Sheets

FIRST MODEL

| R SQUARED | 0.649472 |
|---|---|
| FREEDOM ADJUSTMENT R SQUARED | 0.621632 |
| STANDARD DEVIATION OF ERROR (RMSE) | 1.602451 |
| AVERAGE OF Y | 413.4363 |
| OBSERVATION (OR TOTAL OF WEIGHT) | 300 |

SECOND MODEL

| R SQUARED | 0.423484 |
|---|---|
| FREEDOM ADJUSTMENT R SQUARED | 0.397279 |
| STANDARD DEVIATION OF ERROR (RMSE) | 2.022488 |
| AVERAGE OF Y | 413.4363 |
| OBSERVATION (OR TOTAL OF WEIGHT) | 300 |

(56) References Cited

FOREIGN PATENT DOCUMENTS

| JP | 2004-086897 | 3/2004 |
| JP | 2010-282547 | 12/2010 |
| JP | 2012-81518 A | 4/2012 |
| JP | 2016-164730 | 9/2016 |

OTHER PUBLICATIONS

Uchimaru, Taku et al., "Efficient Wavenumber Selection Based on Nearest Correlation Louvain Method for NIR Calibration Modeling", 2015, IEEE. (Year: 2015).*
MacMahon, Mel et al. "Community Detection for Correlation Matrices", Oct. 28, 2014. (Year: 2014).*
Fujiwara, Koichi, et al., "Correlation-Based Spectral Clustering for Flexible Soft-Sensor Design", Jul. 5-7, 2010, 9th International Symposium on Dynamics and Control of Process Systems (DYCOPS 2010), IFAC. (Year: 2010).*
T. Uchimaru et al., Efficient Variable Selection Based on Nearest Correlation Louvain Method for Soft-sensor Design, Proceedings of the $59^{th}$ Annual Conference of the Institute of Systems, Control and Information Engineers, May 27, 2015, 18 pages.

* cited by examiner

NUMBER OF VARIABLES X: 34 VARIABLES

| Y | 1 | 2 | 3 | 4 | 5 | | 34 |
|---|---|---|---|---|---|---|---|
| 10953 | 9.397886 | 6.925787 | 30.3001 | 60.42678 | 15.76753 | | 0 |
| 10704.53 | 9.432176 | 6.973338 | 28.7855 | 58.69291 | 16.14698 | | 0 |
| 10830.39 | 9.328763 | 6.957468 | 29.8371 | 60.50417 | 15.91665 | | 0 |
| 10916.09 | 9.514286 | 6.982236 | 27.8968 | 58.12521 | 15.96218 | | 1 |
| 10581.88 | 9.361582 | 6.955828 | 28.9567 | 59.09208 | 15.6299 | | 0 |
| 10913.7 | 9.479033 | 6.958424 | 28.9852 | 58.73418 | 15.93028 | ...... | 1 |
| 10602.22 | 9.48917 | 6.911323 | 29.6526 | 60.66735 | 15.8129 | | 1 |
| 11048.02 | 9.528003 | 6.920125 | 29.2685 | 59.39637 | 15.74223 | | 0 |
| 10872.2 | 9.540267 | 6.967372 | 29.1556 | 60.21121 | 15.76737 | | 1 |
| 10809.36 | 9.538281 | 6.985339 | 28.1781 | 58.25529 | 16.06997 | | 1 |
| 11182.84 | 9.516403 | 6.89649 | 30.9167 | 59.78192 | 15.55952 | | 0 |
| 10768.02 | 9.380133 | 6.896639 | 27.9388 | 59.81409 | 15.87573 | | 1 |

FIG. 13

NUMBER OF VARIABLES X: 15 VARIABLES

| Y | 1 | 2 | 3 | 5 | 7 | | 26 |
|---|---|---|---|---|---|---|---|
| 10953 | 9.397886 | 6.925787 | 30.3001 | 15.76753 | 10.20152 | | -1 |
| 10704.53 | 9.432176 | 6.973338 | 28.7855 | 16.14698 | 10.65893 | | 1 |
| 10830.39 | 9.328763 | 6.957468 | 29.8371 | 15.91665 | 10.31272 | | 1 |
| 10916.09 | 9.514286 | 6.982236 | 27.8968 | 15.96218 | 10.52665 | | 1 |
| 10581.88 | 9.361582 | 6.955828 | 28.9567 | 15.6299 | 10.64813 | | -1 |
| 10913.7 | 9.479033 | 6.958424 | 28.9852 | 15.93028 | 10.81452 | ...... | 1 |
| 10602.22 | 9.48917 | 6.911323 | 29.6526 | 15.8129 | 10.67148 | | 1 |
| 11048.02 | 9.528003 | 6.920125 | 29.2685 | 15.74223 | 10.23597 | | -1 |
| 10872.2 | 9.540267 | 6.967372 | 29.1556 | 15.76737 | 10.6542 | | 1 |
| 10809.36 | 9.538281 | 6.985339 | 28.1781 | 16.06997 | 11.0833 | | 1 |
| 11182.84 | 9.516403 | 6.89649 | 30.9167 | 15.55952 | 10.4271 | | -1 |
| 10768.02 | 9.380133 | 6.896639 | 27.9388 | 15.87573 | 10.5309 | | 1 |

FIG. 14

| ITEM | ESTIMATED VALUE | STANDARD ERROR | t-VALUE | p-VALUE | VIF |
|---|---|---|---|---|---|
| 7 | -167.214 | 23.85554 | -7.01 | <.0001 | 1.273778 |
| 3 | 47.11609 | 7.270063 | 6.48 | <.0001 | 1.157191 |
| 10 | -40.6145 | 8.774302 | -4.63 | <.0001 | 1.840738 |
| 13 | -44.518 | 9.961083 | -4.47 | <.0001 | 2.547924 |
| 12 | -42.4233 | 11.40362 | -3.72 | 0.0002 | 1.335615 |
| 2 | 611.4651 | 165.6208 | 3.69 | 0.0003 | 1.264709 |
| 17 | -39.0424 | 11.10481 | -3.52 | 0.0005 | 1.704163 |
| 5 | 129.4989 | 38.30949 | 3.38 | 0.0008 | 1.158708 |
| 18 | -26.4435 | 8.440803 | -3.13 | 0.0019 | 1.813841 |
| 19 | 29.16122 | 9.527514 | 3.06 | 0.0024 | 1.254435 |
| 11 | -26.2693 | 10.01173 | -2.62 | 0.0091 | 1.509512 |
| 26 | -20.875 | 8.132924 | -2.57 | 0.0107 | 1.42692 |
| 23 | -19.3988 | 8.500837 | -2.28 | 0.0231 | 1.451533 |
| 1 | 190.3727 | 83.48954 | 2.28 | 0.0232 | 1.174898 |
| 8 | -16.6982 | 7.662386 | -2.18 | 0.03 | 1.409948 |
| INTERCEPT | 3187.93 | 1500.705 | 2.12 | 0.0344 | . |

(rows for ITEM 7 through 8 are the 15 VARIABLES SELECTED BY NCLM)

FIG. 15

NUMBER OF VARIABLES X: 270 VARIABLES

| Y | 1 | 2 | 3 | 4 | 5 | ... | 269 | 270 |
|---|---|---|---|---|---|---|---|---|
| 412.9201 | 0 | 0 | 0 | 0 | 0 | | 72.6 | 69.3 |
| 413.1606 | 0 | 0 | 0 | 0 | 0 | | 72.5 | 69.3 |
| 412.9622 | 0 | 0 | 0 | 0 | 1 | | 72.6 | 69.5 |
| 418.0694 | 1 | 0 | 0 | 0 | 0 | | 72.2 | 69.3 |
| 414.2049 | 0 | 0 | 1 | 0 | 0 | | 72.5 | 69.3 |

NUMBER OF VARIABLES X: 132 VARIABLES

| 1 | 2 | 3 | 4 |
|---|---|---|---|
| 0 | 0 | 0 | 0 |
| 0 | 0 | 0 | 0 |
| 0 | 0 | 0 | 0 |
| 1 | 0 | 0 | 0 |
| 0 | 0 | 1 | 0 |

...

| 266 | 268 | 269 | 270 |
|---|---|---|---|
| 92.2 | 71.1 | 72.6 | 69.3 |
| 92.5 | 71 | 72.5 | 69.3 |
| 92.3 | 71.1 | 72.6 | 69.5 |
| 93 | 70.9 | 72.2 | 69.3 |
| 92.5 | 71 | 72.5 | 69.3 |

G2

NUMBER OF VARIABLES X: 62 VARIABLES

| 24 | 40 | 41 | 43 |
|---|---|---|---|
| 0 | 0.214 | 0 | 0 |
| 0 | 0.17 | 0 | 0 |
| 0 | 0.364 | 0 | 0 |
| 0 | 0.204 | 0 | -0.1 |
| 0 | 0.199 | 0.1 | 0 |

...

| 255 | 259 | 263 | 267 |
|---|---|---|---|
| 0.392 | 0.392 | 1.933 | 3.122 |
| 0.372 | 0.372 | 1.908 | 3.094 |
| 0.346 | 0.346 | 2.096 | 2.945 |
| 0.404 | 0.404 | 1.888 | 2.721 |
| 0.415 | 0.415 | 1.915 | 3.067 |

G3

NUMBER OF VARIABLES X: 9 VARIABLES

| 108 | 109 | 110 | 244 | 245 | 246 | 248 | 249 | 250 |
|---|---|---|---|---|---|---|---|---|
| 11.14 | 11.14 | 11.13 | 12.99 | 13.01 | 12.93 | 12.82 | 12.84 | 12.77 |
| 10.98 | 10.98 | 10.97 | 12.78 | 12.79 | 12.72 | 12.61 | 12.63 | 12.56 |
| 11.34 | 11.34 | 11.34 | 13.21 | 13.23 | 13.15 | 13.04 | 13.06 | 12.98 |
| 11.46 | 11.47 | 11.45 | 13.35 | 13.36 | 13.29 | 13.18 | 13.19 | 13.12 |
| 11.32 | 11.33 | 11.32 | 13.2 | 13.22 | 13.15 | 13.03 | 13.05 | 12.98 |

FIG. 18

FIRST MODEL

| R SQUARED | 0.649472 |
|---|---|
| FREEDOM ADJUSTMENT R SQUARED | 0.621632 |
| STANDARD DEVIATION OF ERROR (RMSE) | 1.602451 |
| AVERAGE OF Y | 413.4363 |
| OBSERVATION (OR TOTAL OF WEIGHT) | 300 |

SECOND MODEL

| R SQUARED | 0.423484 |
|---|---|
| FREEDOM ADJUSTMENT R SQUARED | 0.397279 |
| STANDARD DEVIATION OF ERROR (RMSE) | 2.022488 |
| AVERAGE OF Y | 413.4363 |
| OBSERVATION (OR TOTAL OF WEIGHT) | 300 |

FIG. 19

MODEL GENERATION SYSTEM AND MODEL GENERATION METHOD

CROSS-REFERENCE TO RELATED APPLICATIONS

This application is based upon and claims the benefit of priority from Japanese Patent Application No. 2017-064333, filed on Mar. 29, 2017; and Japanese Patent Application No. 2017-249763, filed on Dec. 26, 2017; the entire contents of which are incorporated herein by reference.

FIELD

Embodiments described herein relate generally to a model generation system and a model generation method.

BACKGROUND

A model of the relationship between some output variable (a target variable) and multiple input variables (explanatory variables) is generated to predict the output variable from the input variables. As an example, in the case where the processing of a workpiece is performed in a manufacturing apparatus, a model may be generated for predicting the final quality of the workpiece after the processing, etc., by using various data obtained in the manufacturing apparatus as the input variables. For example, such a model is used to detect the workpiece as being defective in the case where the final quality predicted from the data obtained when processing the workpiece is outside a prescribed control range.

Generally, as the period of use lengthens, the sensitivity of the generated model decreases; and the error of the predicted value with respect to the actual measured value increases. If the error of the predicted value with respect to the actual measured value becomes large, when the predicted value output from the model goes outside the control range, it is difficult to discriminate whether the predicted value going outside the control range is caused by the decrease of the sensitivity of the model, or whether the workpiece actually is defective.

Therefore, it is desirable to develop technology in which the effects of the decrease of the sensitivity can be reduced, and it can be discriminated whether or not the model is sound.

BRIEF DESCRIPTION OF THE DRAWINGS

FIG. 13 illustrates the output variable and the input variables in a first example;

FIG. 14 illustrates the output variable and the input variables selected by NCLM in the first example;

FIG. 15 illustrates the output variable and the input variables selected by filtering in the first example;

FIG. 17 is a drawing illustrating the output variable and the input variables of a second example;

FIG. 18 is a drawing illustrating the input variables selected by the NCLM and the output variable of the second example;

FIG. 19 is a table illustrating characteristics of each model of the second example;

DETAILED DESCRIPTION

Figure 1:
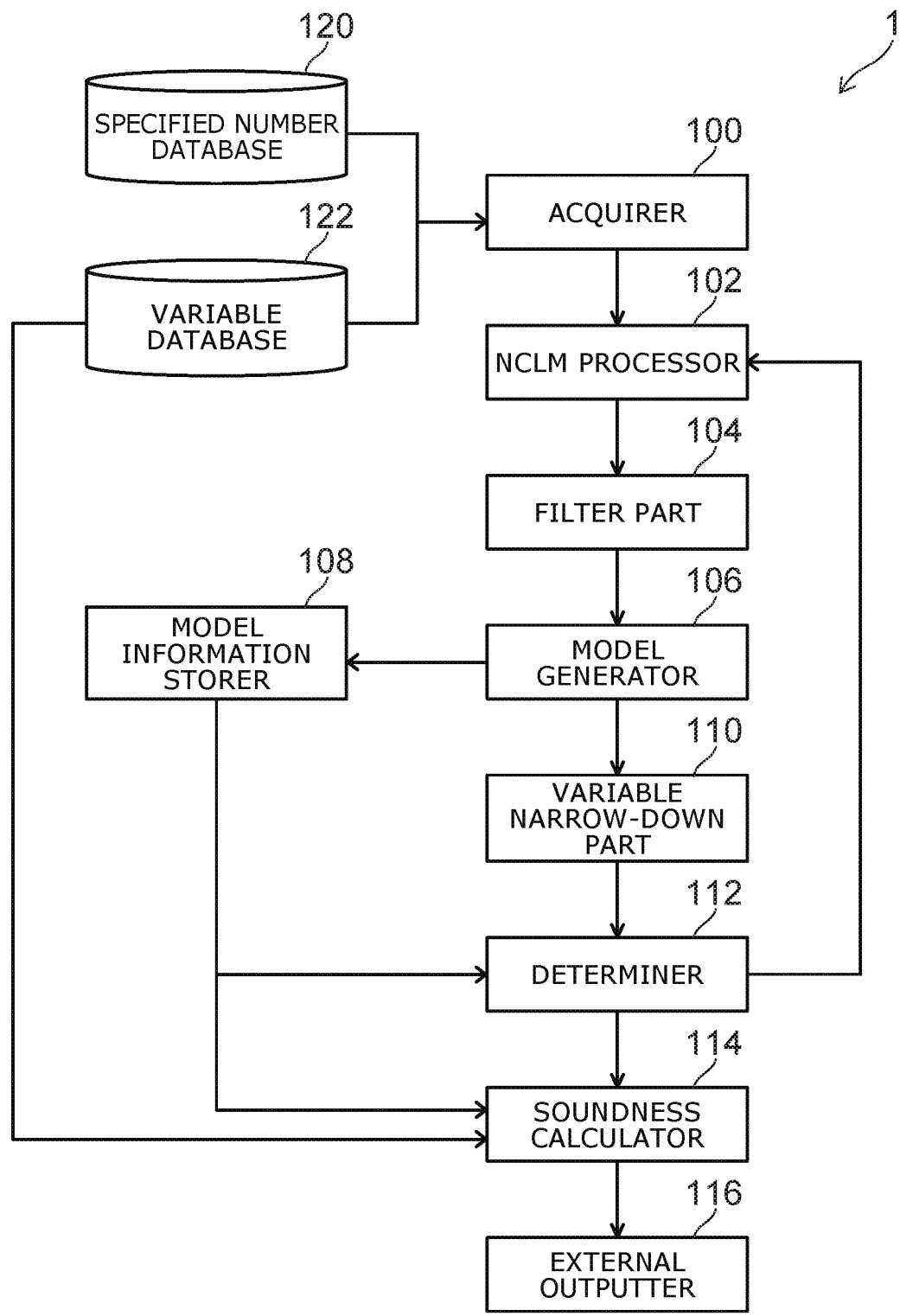
FIG. 1 is a block diagram illustrating the configuration of a model generation system according to a first embodiment.

According to one embodiment, a model generation system includes a NCLM processor, a filter part, a model generator, a variable narrow-down part, a determiner, and a soundness calculator. The NCLM processor narrows down a first input variable group to a second input variable group selected using the Nearest Correlation Louvain Method (NCLM). The first input variable group includes a plurality of input variables. The filter part narrows down the second input variable group to a third input variable group satisfying a prescribed condition. The model generator generates a model of a relationship between the third input variable group and an output variable. The variable narrow-down part narrows down the first input variable group to one or more of the input variables not used in the generation of the model. The determiner determines whether or not the number of the generated models has reached a specified number. In the case where the number of the models has not reached the specified number, the determiner outputting to the NCLM processor the first input variable group narrowed down by the variable narrow-down part. The soundness calculator calculates an overall soundness of the specified number of the models and calculating a soundness of each of the models.

Embodiments of the invention will now be described with reference to the drawings.

In the drawings and the specification of the application, components similar to those described thereinabove are marked with like reference numerals, and a detailed description is omitted as appropriate.

FIG. 1 is a block diagram illustrating the configuration of a model generation system 1 according to a first embodiment.

As illustrated in FIG. 1, the model generation system 1 includes an acquirer 100, a NCLM processor 102, a filter part 104, a model generator 106, a model information storer 108, a variable narrow-down part 110, a determiner 112, a soundness calculator 114, an external outputter 116, a specified number database 120, and a variable database 122.

The specified number database 120 stores a specified number. The specified number indicates the number of models generated in the model generation system 1. For example, the specified number is pre-input by a user. The variable database 122 stores variable data which is the actual measured values of the variables for the input variables and the output variable.

The acquirer 100 acquires the specified number and the variable data respectively from the specified number database 120 and the variable database 122. The acquirer 100 outputs the acquired information to the NCLM processor 102.

The NCLM processor 102 narrows down, to multiple input variables selected using the Nearest Correlation Louvain Method (NCLM), the multiple input variables acquired by the acquirer 100. The NCLM is a method combining the NC (Nearest Correlation) Method and the Louvain Method. By using the NC Method, variables that have a high correlation and are highly similar (have a strong correlation) can be found from many input variables. The Louvain Method is one optimization method that subdivides a weighted graph into multiple groups. In the Louvain Method, the weighted graph is subdivided into the multiple groups so that the connections inside the groups are dense, and the connections between the groups are sparse. Similar variables found using the NC Method are considered to be connected. Thereby, the group subdivision can be implemented so that similar variables are allotted to the same group, and variables having low correlation are allotted to different groups. Partial Least Squares (PLS) is used on the subdivision results; and only the groups that can describe the output variable well are selected. Then, by combining these methods, the grouping of many input variables can be performed by considering the similarity between the variables. It is possible to perform the selection of the input variables by group unit. In other words, the NCLM processor 102 narrows down the multiple input variables to one or more input variables that can best describe the output variable.

The NCLM, the NC Method, and the Louvain Method are elaborated in Uchimaru, T., Hazama, K., Fujiwara, K., and Kano, M., Nearest Correlation Louvain Method for Fast and Good Selection of Input Variables of Statistical Model, 9th International Symposium on Advanced Control of Chemical Processes, received Nov. 15, 2014.

The filter part 104 filters the multiple input variables input from the NCLM processor 102. Thereby, the multiple input variables are narrowed down to a portion of the multiple input variables recited above satisfying a preset prescribed condition. The filter part 104 outputs the portion of the multiple input variables recited above to the model generator 106.

To provide a concise description hereinbelow, the group of the multiple input variables that is input to the NCLM processor 102 and on which the narrowing down is performed using NCLM also is called the "first input variable group." The group of the multiple input variables narrowed down using the NCLM also is called the "second input variable group." The group of the input variables narrowed down by the filter part 104 from the second input variable group also is called the "third input variable group."

The model generator 106 generates a model of the relationship between the output variable and the third input variable group input from the filter part 104. The model generator 106 generates the model using, for example, multiple regression or Partial Least Squares (PLS). The model generator 106 stores the generated model information in the model information storer 108.

The variable narrow-down part 110 narrows down the first input variable group to one or more input variables not used in the generation of the model. In other words, the input variables that are used in the generation of the model from the first input variable group are excluded. The variable narrow-down part 110 outputs the narrowed-down first input variable group to the determiner 112.

The determiner 112 determines whether or not the amount of the model information (the number of models generated by the model generator 106) stored in the model information storer 108 has reached the specified number. If the determiner 112 determines that the amount of the model information has not reached the specified number, the first input variable group that is narrowed down by the variable narrow-down part 110 is input to the NCLM processor 102.

The narrowing down to the second input variable group and the third input variable group is re-performed in the NCLM processor 102 and the filter part 104. Another model is generated by the model generator 106. At this time, the input variables that are already used in the generation of the model are not included in the third input variable group input to the model generator 106. Accordingly, another model of the relationship between the output variable and at least a portion of the multiple input variables not yet used in the generation of the model is generated by the model generator 106.

The processing by the NCLM processor 102, the filter part 104, the model generator 106, and the variable narrow-down part 110 is repeated until the number of the generated models has reached the specified number. When the number of the generated models reaches the specified number, the soundness calculator 114 acquires the model information from the model information storer 108 and acquires the variable data from the variable database 122. Based on the acquired data, the soundness calculator 114 calculates the overall soundness of the generated model group and the soundness of each model.

Specifically, first, the soundness calculator 114 obtains the output variable (the predicted value) by inputting variable data as the input variables of each of the generated models.

For example, the determination is good in the case where the output variable is within a prescribed range, and defective in the case where the output variable is outside the range. In such a case, the soundness calculator 114 performs the determination for the output result of each model. Then, the number of good determinations and the number of defective determinations are summarized. The soundness calculator 114 uses the greater determination result as the overall determination result.

Or, the soundness calculator 114 calculates the median value, the weighted average value, etc., of the predicted values of the models. The soundness calculator 114 uses the calculated value as a typical value of the model group. The soundness calculator 114 obtains an overall determination result of being good in the case where the typical value is within the prescribed range, and defective in the case where the typical value is outside the range.

Then, the soundness calculator 114 compares the overall determination result and the actual determination result of the output variable (the actual measured value). At this time, if the overall determination result matches the actual determination result, the generated model group is determined to be sound overall.

Or, the soundness calculator 114 may directly compare the actual measured value and the typical value of the model group. In such a case, the Mean Square Error (MSE), the Root Mean Square Error (RMSE), the determination coefficient ($R^2$), the correlation coefficient, or the like is used as an indicator of the soundness.

Then, the soundness calculator 114 compares the actual measured value and the predicted value of each model and compares the determination result of the actual measured value and the determination result of each model. Thereby, the soundness calculator 114 calculates the soundness of each model. When comparing the determination result of the actual measured value and the determination result of the predicted value, discrete values such as "sound" or "abnormal" are obtained as the soundness. When comparing the actual measured value and the predicted value, an indicator such as the MSE, the RMSE, $R^2$, the correlation coefficient, or the like is obtained as the soundness.

Or, the overall determination result or the typical value of the model group may be used as the correct value. The soundness of each model also can be calculated by comparing with the determination result or the predicted value of each model.

It is also possible to control the model groups and the soundness of each model by appropriately combining these methods for calculating the soundness according to the application of the model generation system 1. For example, in order to replace the actual measurements or reduce the frequency of the actual measurements, the soundness of each model is calculated temporarily by using, as the correct value, the typical value of the model group or the determination result of the model group. The overall soundness of the model group and the soundness of each model may be calculated by comparing the predicted values and the actual measured values or the determination results of the predicted values and the actual measured values for a few actual measurement points.

The external outputter 116 displays the information on a display for the user or outputs the information to the outside by outputting in a prescribed file format. The information includes the soundness of the overall model, the soundness of each model, and the predicted value of each model calculated by the soundness calculator 114.

Figure 2:
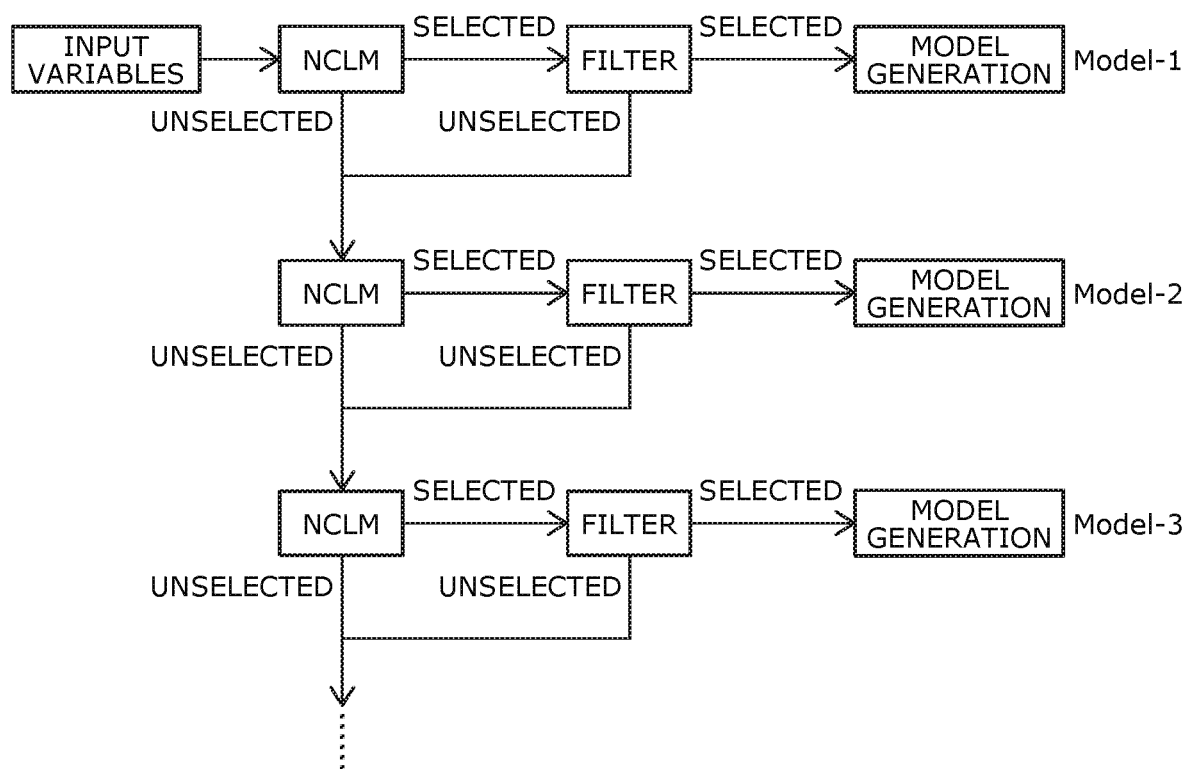
FIG. 2 is a drawing describing the operation of the model generation system according to the first embodiment.

FIG. 2 is a drawing describing the operation of the model generation system 1 according to the first embodiment.

The multiple input variables (the first input variable group) are narrowed down to the multiple input variables (the second input variable group) selected using NCLM. The narrowed-down multiple input variables are filtered. A first model is generated by using the multiple input variables (the third input variable group) narrowed down further by NCLM and filtering.

When generating the first model, the multiple input variables that are used in the generation of second and subsequent models are narrowed down to input variables that are not used in the first model. When generating the second model, the narrowed-down multiple input variables are narrowed down further by NCLM and filtering. The second model is generated by using the narrowed-down multiple input variables.

Thereafter, a similar operation is repeated. In other words, when generating the (n−1)th model, the multiple input variables that are used in the generation of the nth and subsequent models are narrowed down to input variables that are not used in the first, second, . . . , (n−1)th models. The nth model is generated by using at least a portion of the narrowed-down multiple input variables.

Figure 3:
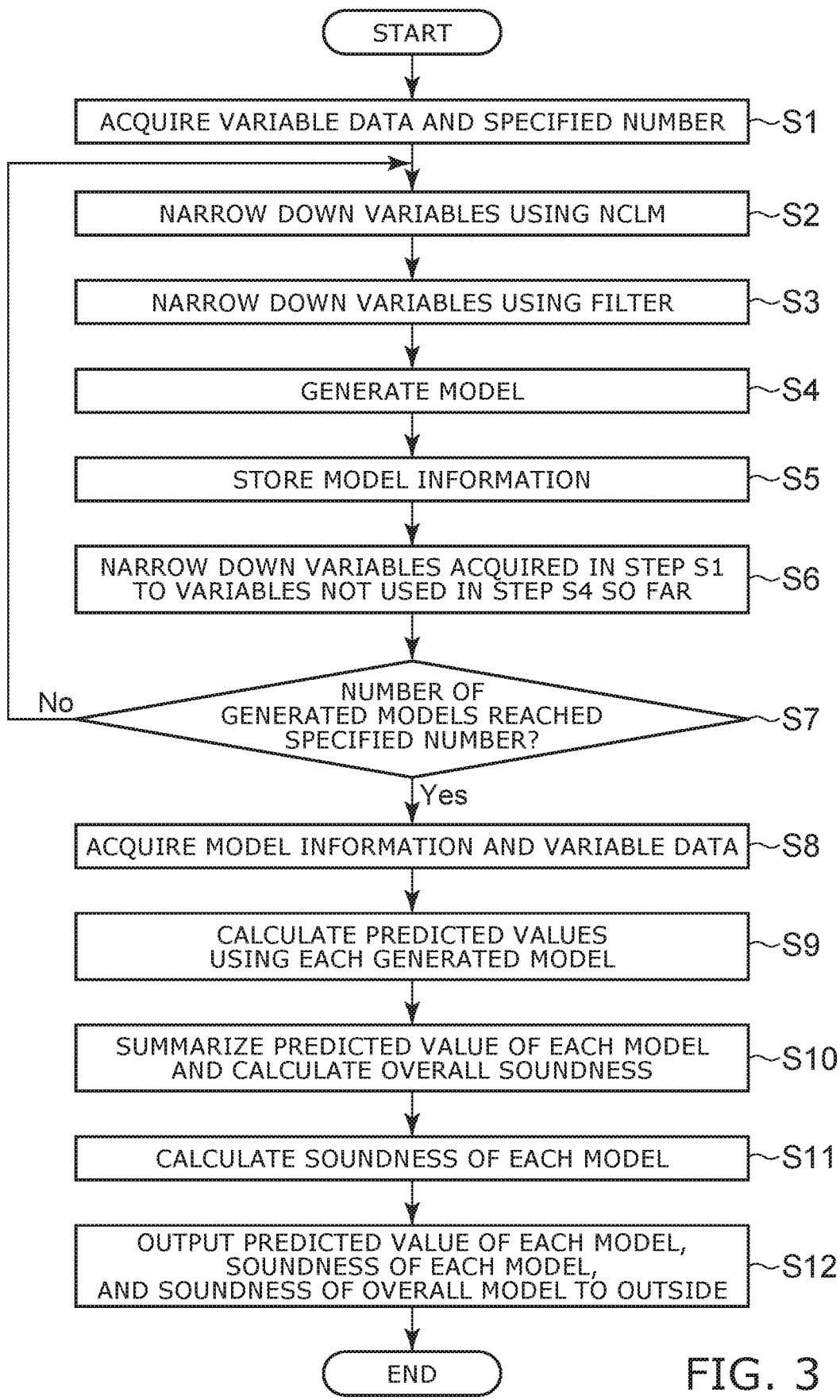
FIG. 3 is a flowchart illustrating the model generation method according to the first embodiment.

FIG. 3 is a flowchart illustrating the model generation method according to the first embodiment.

The acquirer 100 acquires the specified number and the variable data from the specified number database 120 and the variable database 122 (step S1). The NCLM processor 102 narrows down the acquired multiple input variables to multiple input variables selected using NCLM (step S2). The filter part 104 filters the multiple input variables narrowed down by the NCLM to narrow them down to multiple input variables satisfying a preset prescribed condition (step S3). The model generator 106 generates a model of the relationship between the output variable and the multiple input variables narrowed down by the NCLM and the filtering (step S4).

The model generator 106 stores the generated model information in the model information storer 108 (step S5). The variable narrow-down part 110 narrows down the multiple input variables acquired in step S1 to input variables not used in step S4 (not used in the model generation) (step S6). The determiner 112 determines whether or not the number of the generated models has reached the specified number (step S7). In the case where the number of models has not reached the specified number, steps S2 to S6 are again executed based on the input variables narrowed down in step S6.

When the number of models has reached the specified number, the soundness calculator 114 acquires the model information and the variable data from the model information storer 108 and the variable database 122 (step S8). The soundness calculator 114 calculates the predicted value of each model by using the variable data and the model information that are acquired (step S9). The soundness calculator 114 summarizes the predicted values of the models and calculates the overall soundness (step S10). The soundness calculator 114 calculates the soundness of each model (step S11). The external outputter 116 outputs the predicted value of each model, the soundness of each model, and the soundness of the overall model to the outside (step S12).

Effects according to the embodiment will now be described.

To reduce the effects of the sensitivity decrease of the model, it may be considered to use multiple models, and to discriminate whether or not the models are sound overall from the multiple predicted values. However, in the case where the behaviors of the multiple models are similar to each other, the sensitivity may decrease similarly for the multiple models; or a large error may temporarily occur similarly for the multiple models. Therefore, the discrimination of the soundness is difficult.

In the model generation system 1 according to the embodiment, the multiple input variables are narrowed down by the NCLM processor 102. The multiple input variables that are included in the second input variable group narrowed down by the NCLM processor 102 have strong correlations to each other. In other words, the correlation weakens between the input variable group narrowed down by the NCLM processor 102 and the input variable group not narrowed down by the NCLM processor 102. Accordingly, the behaviors of the models generated using these input variable groups easily become different from each other.

In the model generation system 1, the second input variable group is narrowed down by the filter part 104. Therefore, the accuracy of the model with respect to the output variable also can be increased. In other words, according to the model generation system 1, by using the NCLM processor 102, the filter part 104, the model generator 106, and the variable narrow-down part 110, multiple models can be generated in which the behaviors are different from each other while increasing the accuracy of each model with respect to the output variable.

The soundness calculator 114 calculates, for the models that are generated, the soundness of each of the models and the overall soundness of the specified number of models. The overall soundness and the soundness of each model can be confirmed. Thereby, even in the case where the output variables of a portion of the models are outside the control range, etc., it can be discriminated more accurately whether the output variables being outside the control range is caused by the decrease of the sensitivity of the model, or whether such fluctuation has actually occurred.

The model generation system 1 according to the embodiment again inputs, to the NCLM processor 102, the first input variable group narrowed down by the variable narrow-down part 110. For example, the conditions of the NCLM executed by the NCLM processor 102 can be adjusted to match the increase of the number of generated models. By such a method, multiple models can be generated in which the behaviors are different from each other while further increasing the accuracy of each model with respect to the output variable.

Second Embodiment

Figure 4:
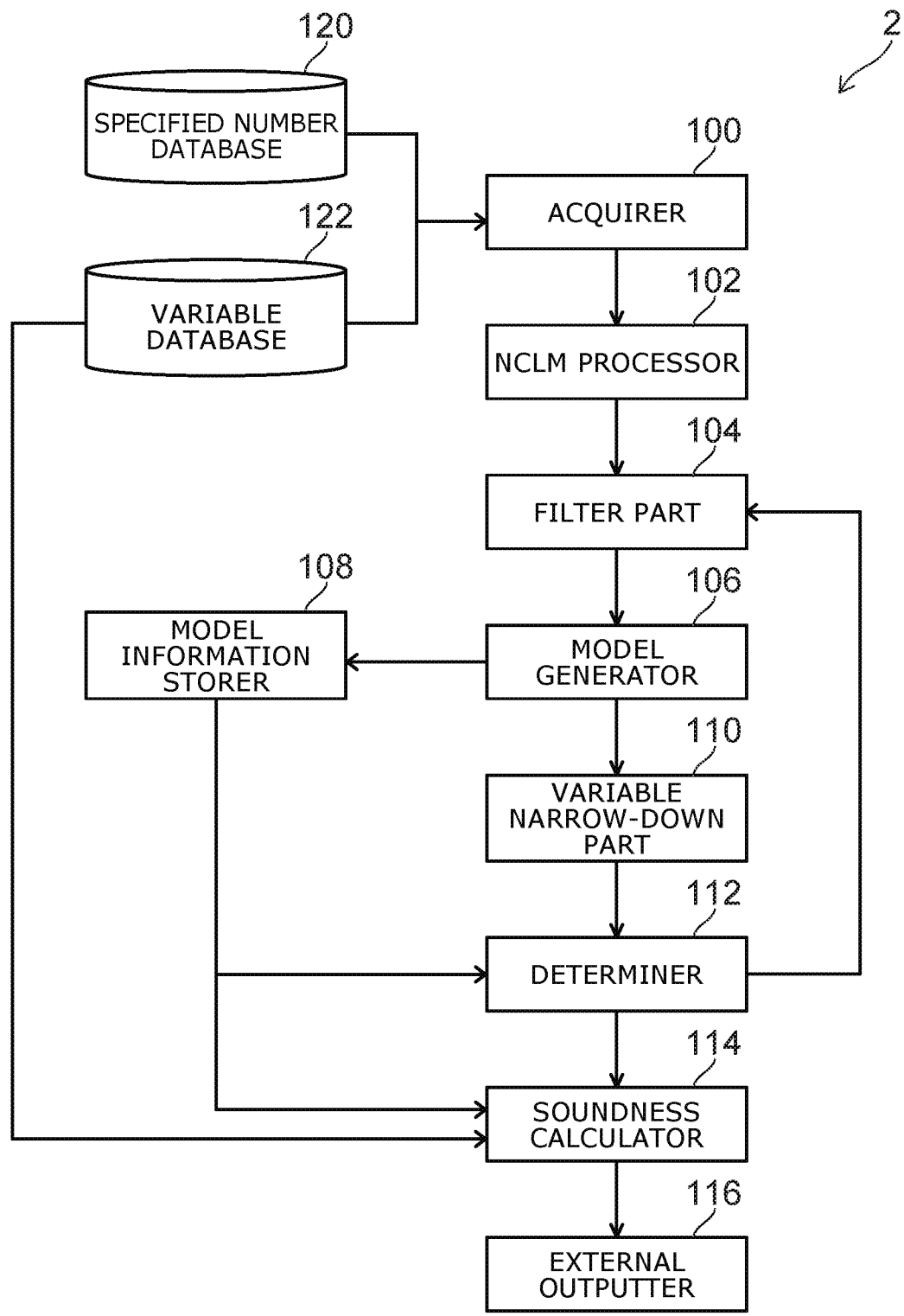
FIG. 4 is a block diagram illustrating the configuration of a model generation system according to a second embodiment.

FIG. 4 is a block diagram illustrating the configuration of a model generation system 2 according to a second embodiment.

In the model generation system 1 according to the first embodiment, the variable narrow-down part 110 narrows down the first input variable group to input variables not used in the generation of the model. Then, the narrowed-down first input variable group is input to the NCLM processor 102.

In the model generation system 2 according to the second embodiment illustrated in FIG. 4, the variable narrow-down part 110 narrows down the second input variable group to input variables not used in the generation of the model. Then, the narrowed-down second input variable group is input to the filter part 104.

Accordingly, in the model generation system 2, the first input variable group that is not narrowed down by the NCLM processor 102, that is, the input variables of the first input variable group other than the second input variable group, are not used in the generation of the model.

Figure 5:
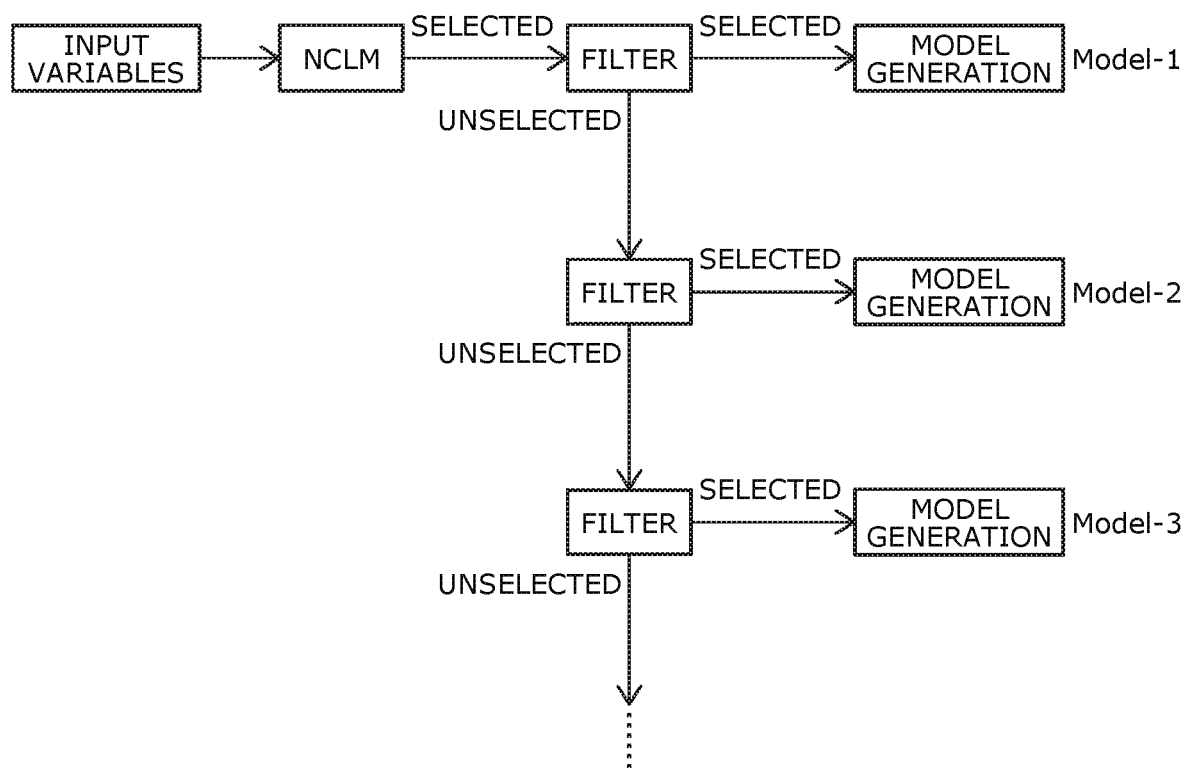
FIG. 5 is a drawing describing the operation of the model generation system according to the second embodiment.

FIG. 5 is a drawing describing the operation of the model generation system 2 according to the second embodiment.

As illustrated in FIG. 5, similarly to the model generation system 1 according to the first embodiment, the first model is generated using input variables narrowed down by NCLM and filtering. The subsequent models are generated using input variables that are narrowed down by the NCLM and not narrowed down by the filter.

Figure 6:
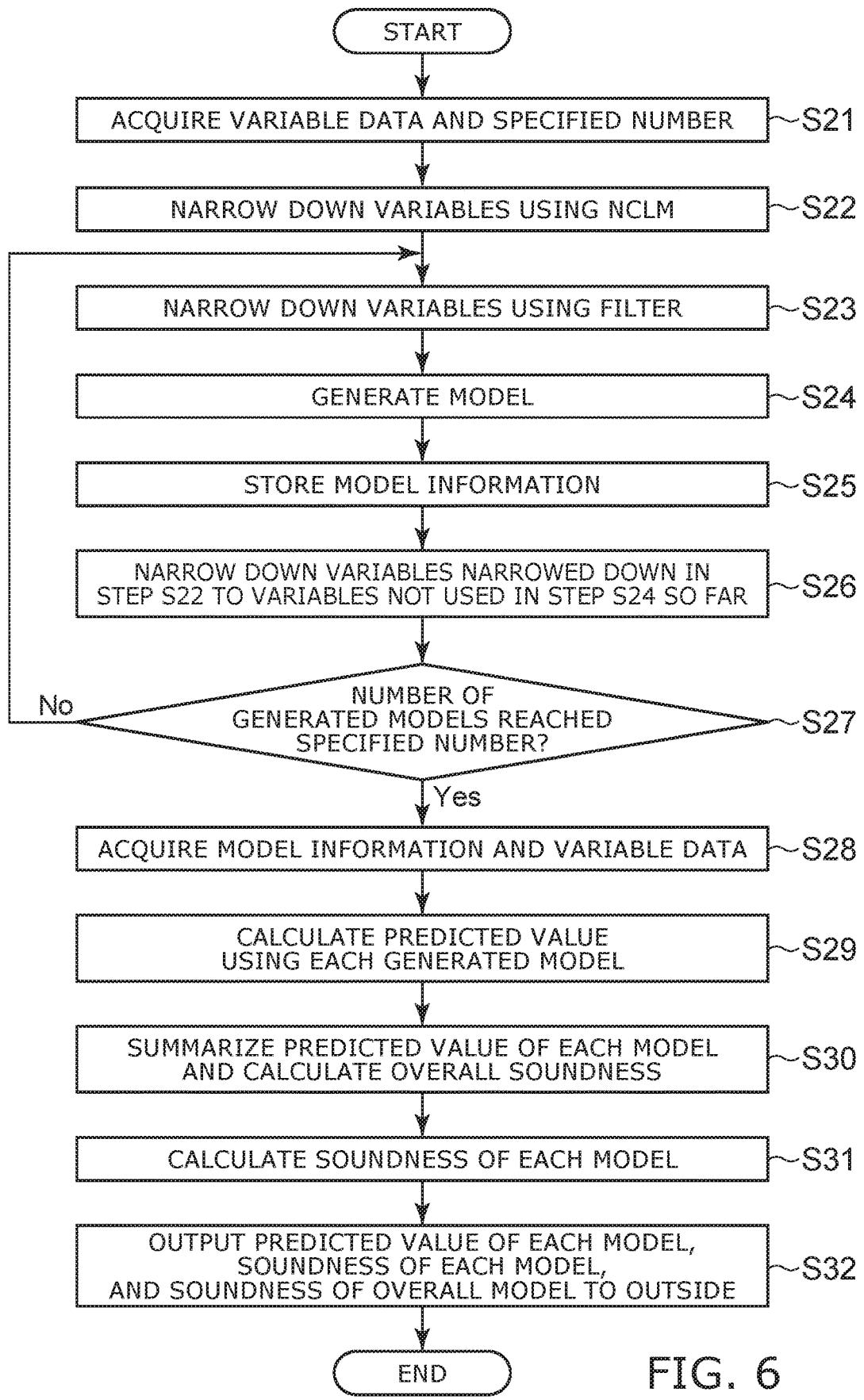
FIG. 6 is a flowchart illustrating the model generation method according to the second embodiment.

FIG. 6 is a flowchart illustrating the model generation method according to the second embodiment.

Step S21 to step S25 are executed similarly to the steps S1 to S5 of the flowchart illustrated in FIG. 3. The variable narrow-down part 110 narrows down the variables narrowed down by step S22 to variables not used in step S24 (step S26). The determiner 112 determines whether or not the number of the generated models has reached the specified number (step S27). In the case where the number of models has not reached the specified number, steps S23 to S26 are again executed based on the input variables narrowed down by step S26. After the number of models has reached the specified number, step S28 to step S32 are executed similarly to the steps S8 to S12 of the flowchart illustrated in FIG. 3.

As described in the description of the first embodiment, the NCLM processor 102 narrows down the first input variable group to the second input variable group including multiple input variables having a strong correlation and a high accuracy with respect to the output variable. Then, in the model generation system 2 according to the embodiment, based on the second input variable group, the generation of the model and the narrowing down of the input variables are performed repeatedly. Accordingly, according to the model generation system according to the embodiment, the behaviors of the generated models easily become relatively similar to each other; but it is possible to increase the accuracy of each model.

Third Embodiment

Figure 7:
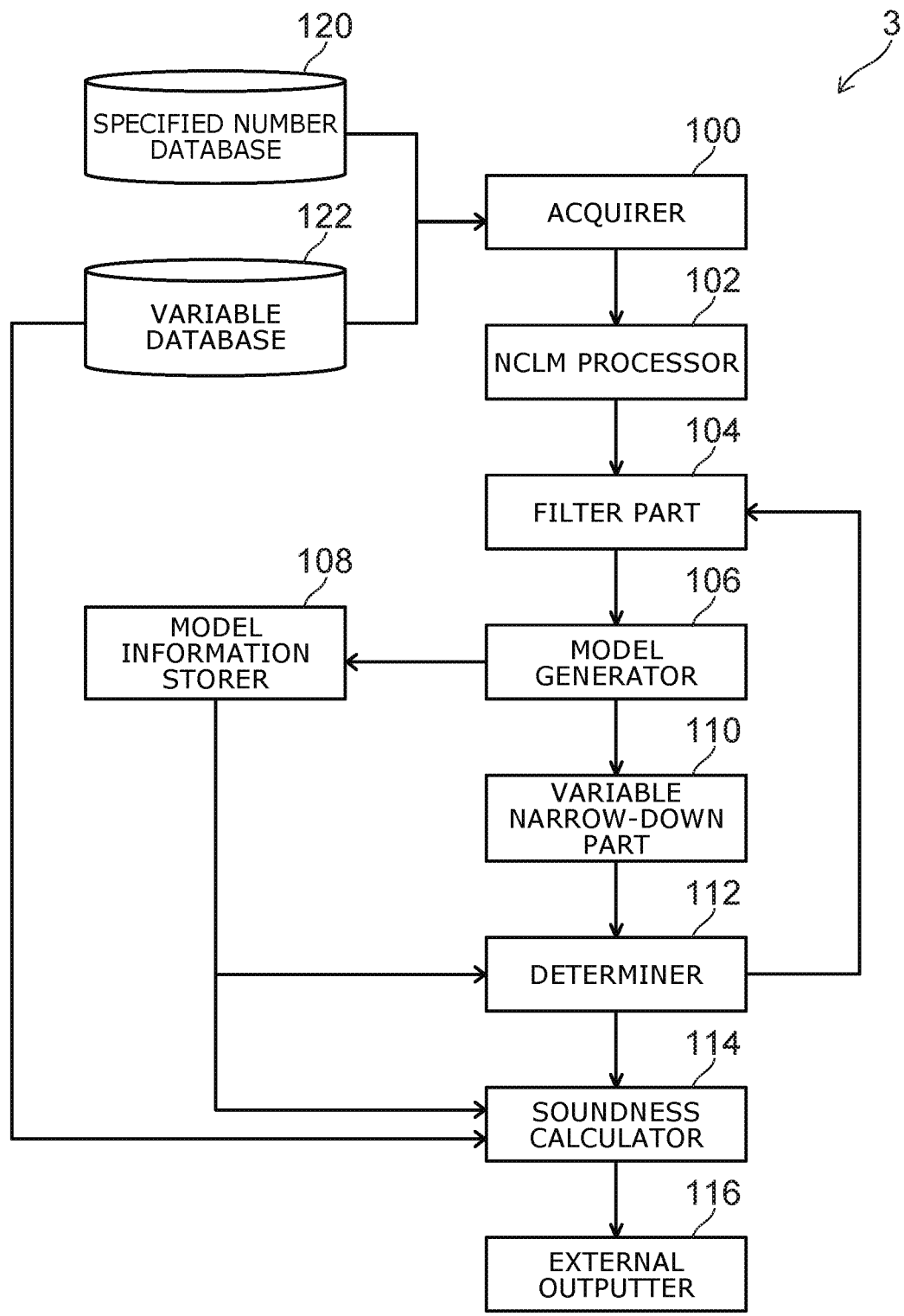
FIG. 7 is a block diagram illustrating the configuration of a model generation system according to a third embodiment.

FIG. 7 is a block diagram illustrating the configuration of a model generation system 3 according to a third embodiment.

In the model generation system 3 according to the third embodiment illustrated in FIG. 7, the variable narrow-down part 110 narrows down the first input variable group to input variables not used in the generation of the model. Then, the narrowed-down first input variable group is input to the filter part 104 as the second input variable group.

In other words, in the model generation system 1, the narrowing down of the input variables by the NCLM processor 102 is performed each time when generating each model. In the model generation system 3, the narrowing down of the input variables by the NCLM processor 102 is performed only when generating the initial model.

Figure 8:
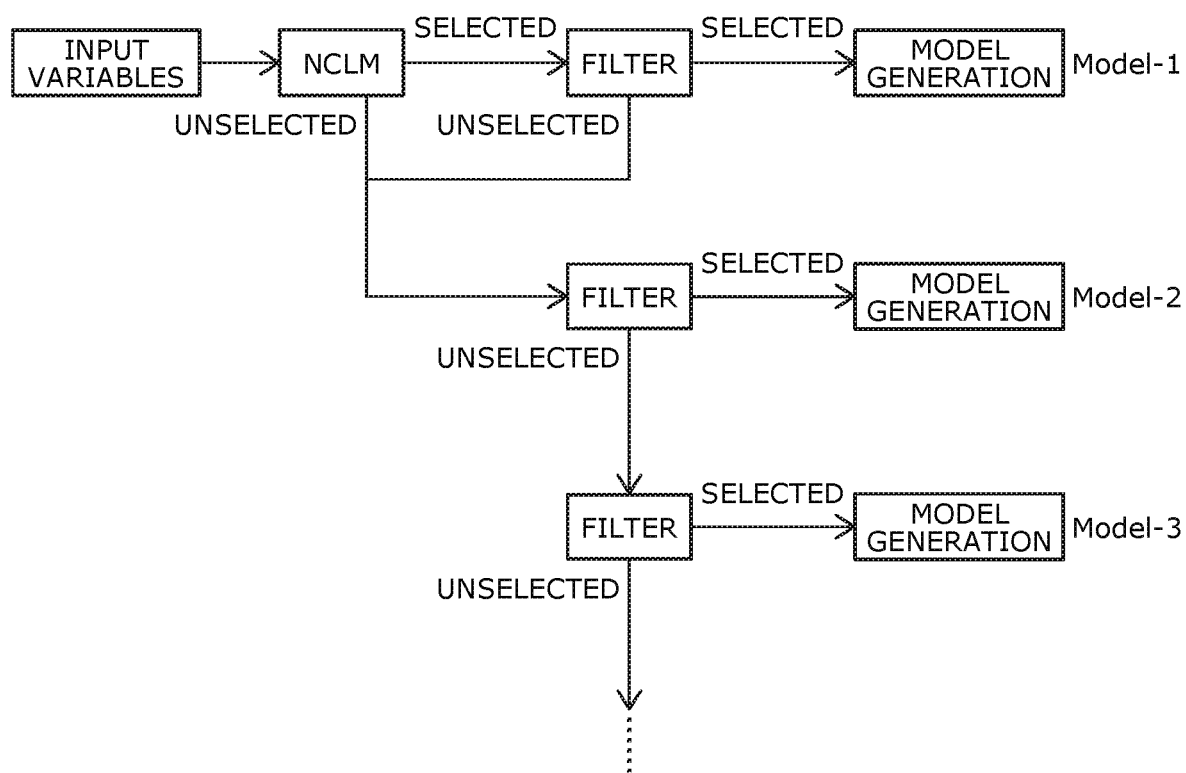
FIG. 8 is a drawing describing the operation of the model generation system according to the third embodiment.

FIG. 8 is a drawing describing the operation of the model generation system 3 according to the third embodiment.

As illustrated in FIG. 8, similarly to the model generation system 1 according to the first embodiment, the first model is generated using input variables narrowed down by NCLM and filtering. The second model is generated using input variables that are not narrowed down by the NCLM and the filtering, but are then narrowed down by filtering. The subsequent models are generated using filters to narrow down the input variables not narrowed down by the previous filter.

Figure 9:
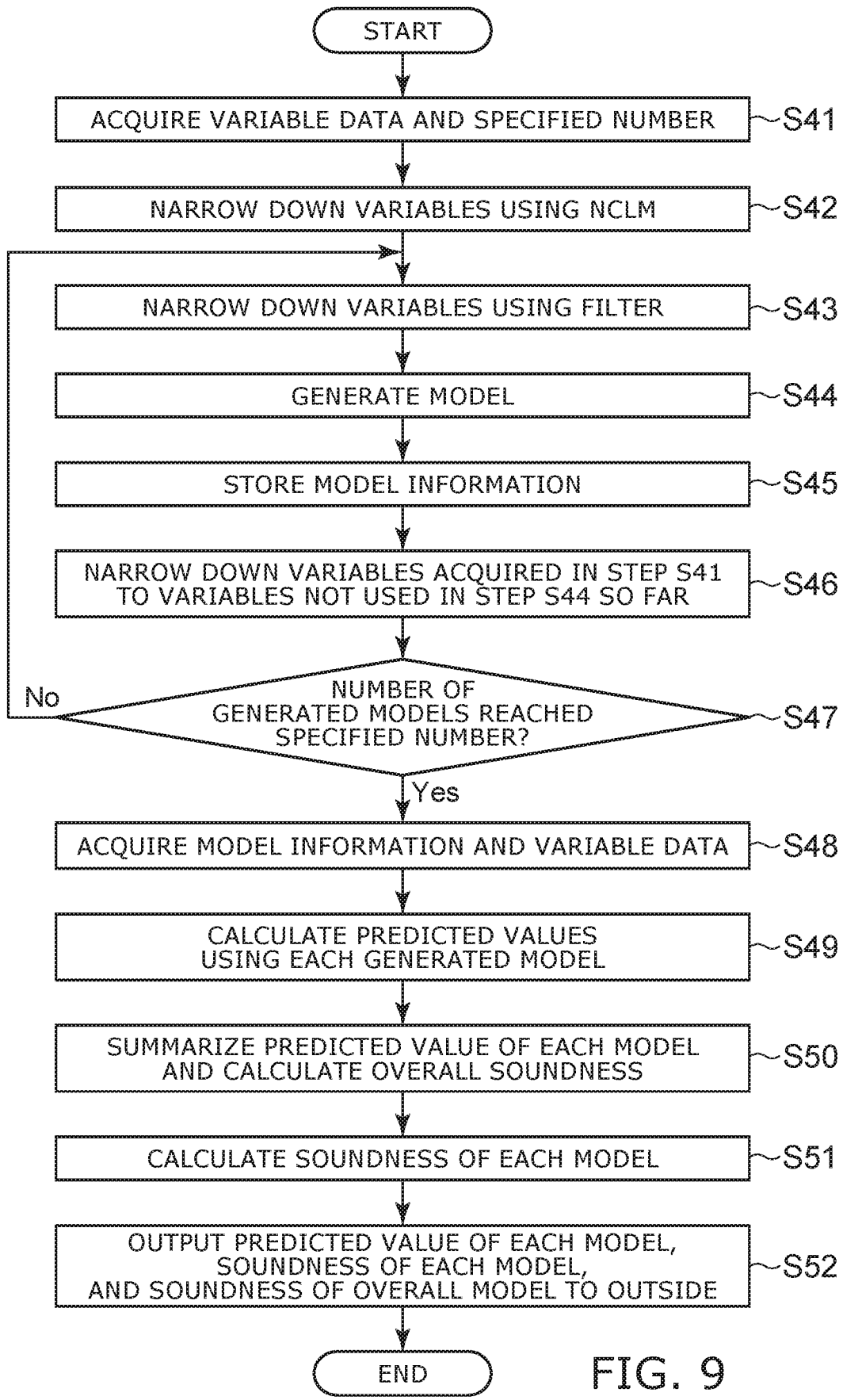
FIG. 9 is a flowchart illustrating the model generation method according to the third embodiment.

FIG. 9 is a flowchart illustrating the model generation method according to the third embodiment.

Step S41 to step S45 are executed similarly to the steps S1 to S5 of the flowchart illustrated in FIG. 3. The variable narrow-down part 110 narrows down the multiple input variables acquired in step S41 to variables not used in step S44 (step S46). The determiner 112 determines whether or not the number of the generated models has reached the specified number (step S47). In the case where the number of models has not reached the specified number, steps S43 to S46 are again executed based on the input variables narrowed down by step S46. After the number of models has reached the specified number, steps S48 to S52 are executed similarly to the steps S8 to S12 of the flowchart illustrated in FIG. 3.

As described in the description of the first embodiment, the correlation weakens between the input variable group narrowed down by the NCLM processor 102 and the input variable group not narrowed down by the NCLM processor 102. Accordingly, without repeating the narrowing down by the NCLM processor 102 for the input variable group not narrowed down by the NCLM processor 102, it is possible to generate a model having a behavior different from that of the first model. The input variable group is narrowed down by the filter part 104 in the generation of the second and subsequent models. Therefore, it is also possible to increase the accuracy with respect to the output variable.

According to the model generation system 3 according to the embodiment, multiple models can be generated more easily than those of the first embodiment, so that the behaviors are different from each other while increasing the accuracy of each model with respect to the output variable.

Fourth Embodiment

Figure 10:
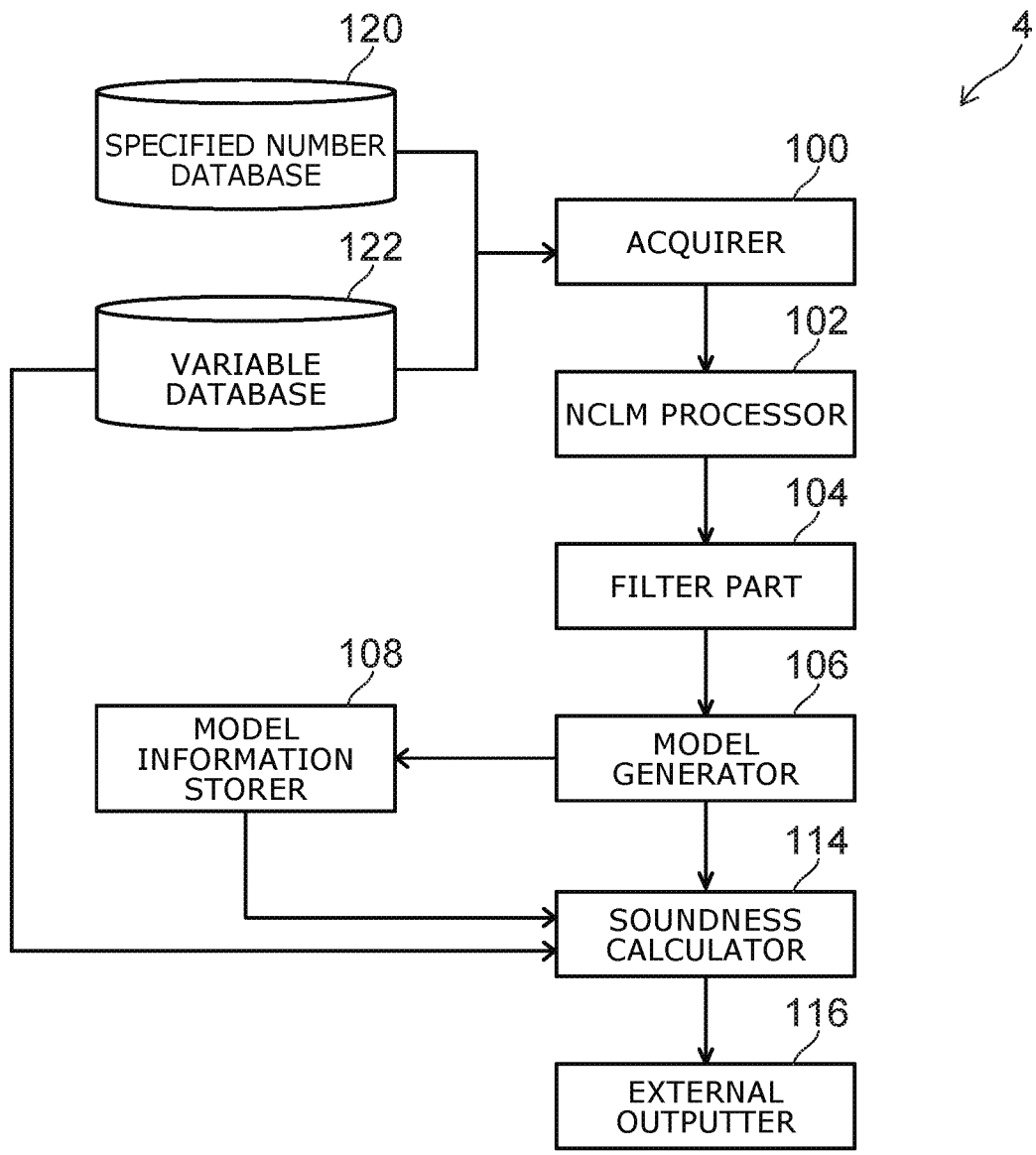
FIG. 10 is a block diagram illustrating the configuration of a model generation system according to a fourth embodiment.

FIG. 10 is a block diagram illustrating the configuration of a model generation system 4 according to a fourth embodiment.

For example, the model generation system 4 according to the fourth embodiment illustrated in FIG. 10 differs from the model generation systems according to the first to third embodiments in that the variable narrow-down part 110 is not included. In the model generation system 4, a set of multiple input variables is generated by the NCLM processor 102. In other words, the NCLM processor 102 generates multiple second input variable groups from the first input variable group. In the case where the number of generated second input variable groups is greater than the specified number, for example, the NCLM processor 102 narrows down the multiple second input variable groups to the specified number of second input variable groups that can better describe the output variable.

The filter part 104 respectively narrows down the multiple second input variable groups into multiple third input variable groups satisfying a prescribed condition. The model generator 106 generates models of relationships between the output variable and the third input variable groups for each of the third input variable groups. The soundness calculator 114 calculates the overall soundness of the multiple models and a soundness of each model.

Figure 11:
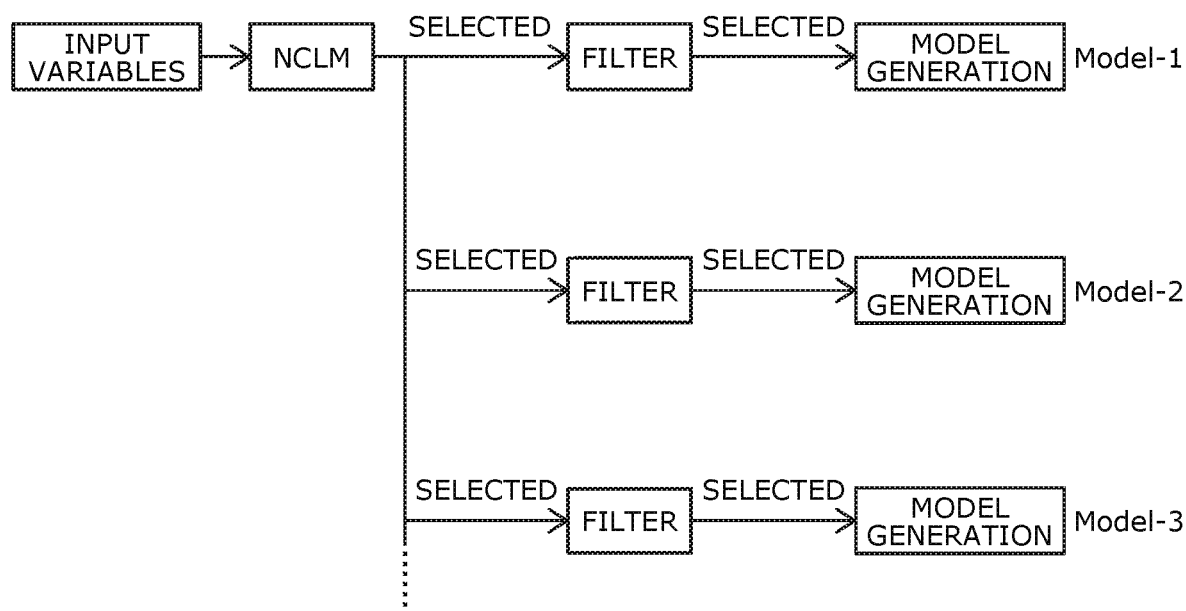
FIG. 11 is a drawing describing the operation of the model generation system according to the fourth embodiment.

FIG. 11 is a drawing describing the operation of the model generation system 4 according to the fourth embodiment.

As illustrated in FIG. 11, the set of multiple input variables (the multiple second input variable groups) is generated using the NCLM. Continuing, each of the second input variable groups is filtered. Then, a model is generated for each of the second input variable groups.

Figure 12:
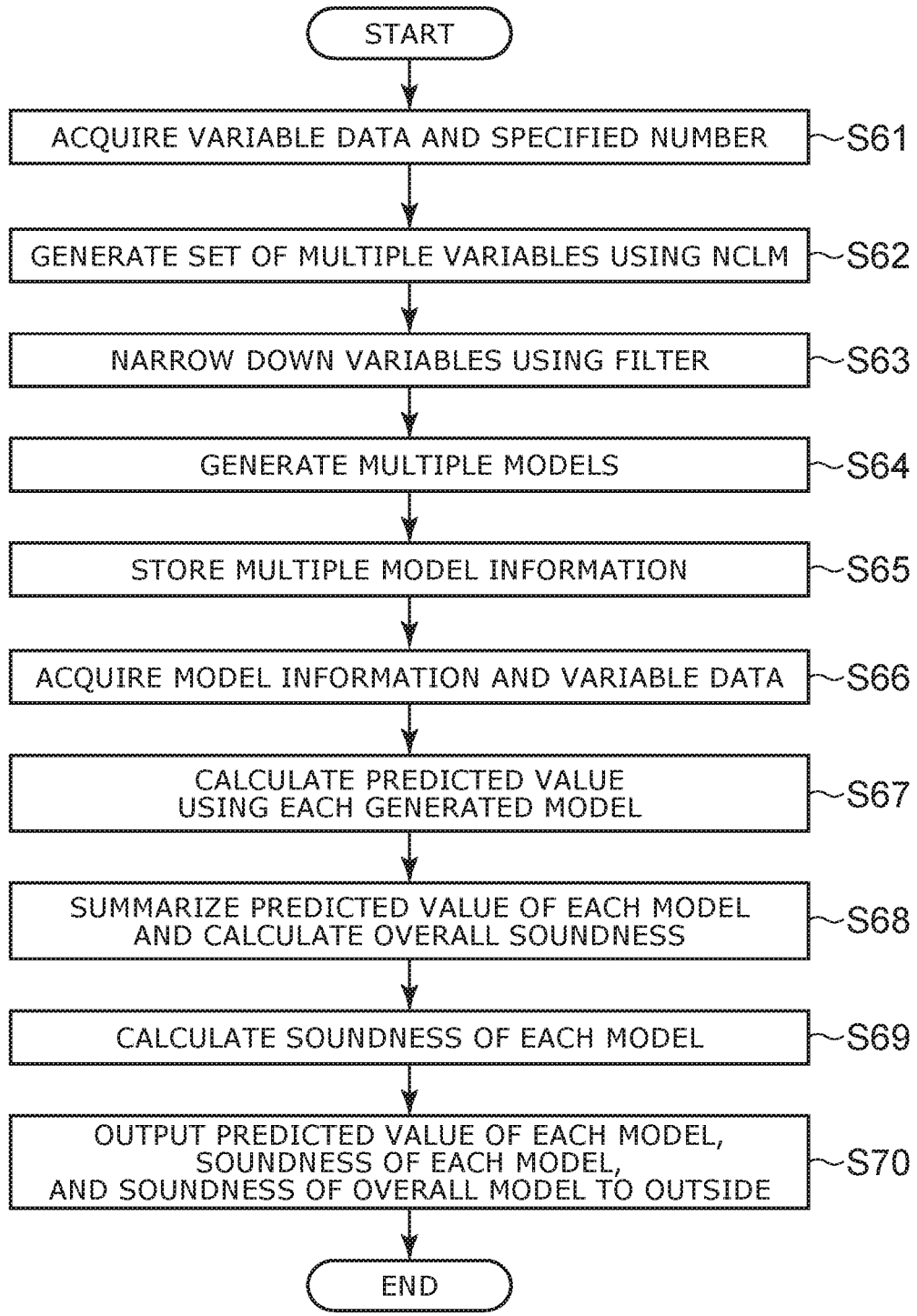
FIG. 12 is a flowchart illustrating the model generation method according to the fourth embodiment.

FIG. 12 is a flowchart illustrating the model generation method according to the fourth embodiment.

The acquirer 100 acquires the specified number and the variable data from the specified number database 120 and the variable database 122 (step S61). The NCLM processor 102 generates the set of multiple input variables (the multiple second input variable groups) from the acquired multiple input variables by selecting using NCLM (step S62). The filter part 104 respectively narrows down the multiple second input variable groups into multiple third input variable groups satisfying the prescribed condition (step S63).

The model generator 106 generates multiple models (step S64). The multiple models are of relationships between the output variable and each of the multiple third input variable groups. The model generator 106 stores the multiple models in the model information storer 108 (step S65). Thereafter, steps S66 to S70 are executed similarly to steps S8 to S12 of the flowchart illustrated in FIG. 3.

First Example

FIG. 13 illustrates the output variable and the input variables in a first example.

FIG. 14 illustrates the output variable and the input variables selected by NCLM in the first example.

FIG. 15 illustrates the output variable and the input variables selected by filtering in the first example.

Figure 16:
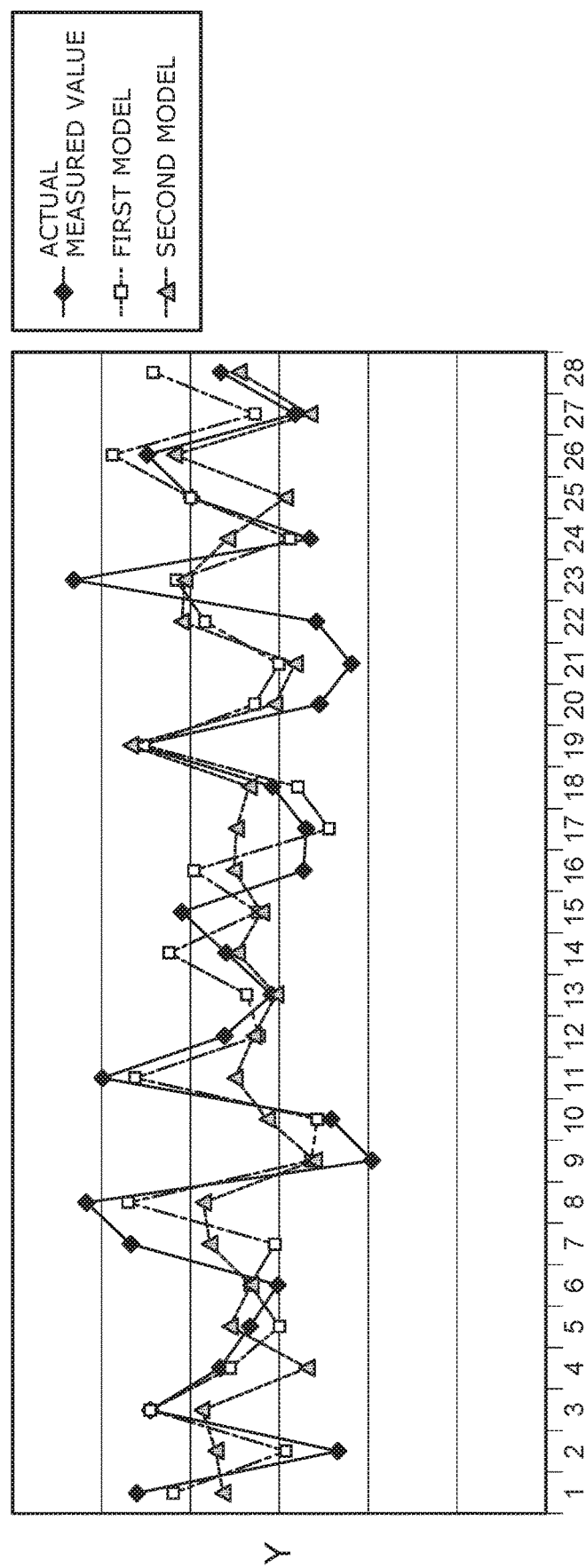
FIG. 16 is a graph illustrating the actual measured value and the predicted value of each model.

FIG. 16 is a graph illustrating the actual measured value and the predicted value of each model in the first example.

The model generation system 2 according to the second embodiment is used in the first example. Here, as illustrated in FIG. 13, an example is described in which the multiple models are generated based on an output variable Y and the variable data of thirty-four input variables X. The output variable Y is the quality characteristic of the workpiece. The input variables X are the qualities of the workpieces after processing in each process. The qualities are based on at least one of the dimensions of the workpiece after processing and the processing rate of the workpiece.

First, the thirty-four input variables (the first input variable group) illustrated in FIG. 13 are input to the NCLM processor 102. As a result, the NCLM processor 102 narrows down the input variables to fifteen input variables (the second input variable group) as illustrated in FIG. 14. Then, the fifteen input variables are input to the filter part 104. In the example illustrated in FIG. 15, the filter part 104 calculates the estimated value, the standard error, the t-value, the p-value, and the VIF (Variance Inflation Factor) for each of the input variables. Then, for example, the filter part 104 narrows down the input explanatory variables to the input variables (the third input variable group) that satisfy having a p-value <0.0001.

In the example illustrated in FIG. 15, the filter part 104 narrows down the input variables to four input variables. The first model of the relationship between the output variable and the four input variables is generated by the model generator 106. Continuing, the variable narrow-down part 110 narrows down, to the eleven input variables not used in the first model, the fifteen input variables (the second input variable group) narrowed down by the NCLM processor 102. Here, the model generator 106 simply generates the second model of the relationship with the output variable by using the eleven input variables (the narrowed-down second input variable group).

FIG. 16 is a graph illustrating the actual measured value of the output variable Y and the predicted values of the first model and the second model. It can be seen from FIG. 16 that the first model can predict the actual measured value with higher accuracy than the second model. On the other hand, although the accuracy of the second model is worse than that of the first model, the second model is not much different from the actual measured values. Further, it can be seen that the first model and the second model exhibit different behaviors for the fluctuation of the actual measured value.

In other words, according to the model generation systems according to the embodiments of the invention, it can be seen that multiple models can be generated in which the behaviors are different from each other while increasing the accuracy with respect to the output variable. By using the predicted values obtained using each of these models, it is possible for the soundness calculator 114 to discriminate more accurately whether or not the generated models are sound by calculating the overall soundness of the model group and the soundness of each model.

Second Example

FIG. 17 is a drawing illustrating the output variable and the input variables of a second example.

FIG. 18 is a drawing illustrating the input variables selected by the NCLM and the output variable of the second example.

FIG. 19 is a table illustrating characteristics of each model of the second example.

Figure 20:
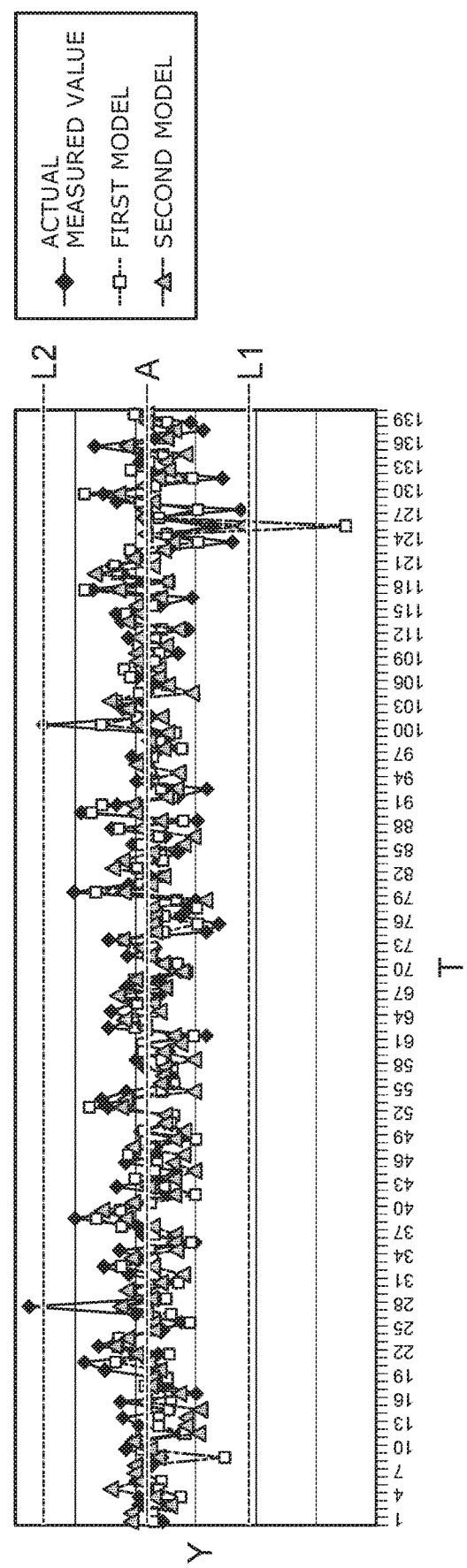
FIG. 20 is a graph illustrating the actual measured value and the predicted values of the models of the second example.

FIG. 20 is a graph illustrating the actual measured value and the predicted values of the models of the second example.

As illustrated in FIG. 17, an example is described in the second example in which the multiple models are generated based on the output variable Y and the variable data of two-hundred and seventy input variables X. The output variable Y is the final quality of the workpiece. The input variables X are the data (the temperature when processing, the pressure, etc.) of sensors obtained in the processes. The final quality is based on at least one of the dimension of the workpiece after the processing or the processing rate of the workpiece. In the example, the model generation system 4 according to the fourth embodiment is used to generate the models.

First, the two hundred and seventy input variables (the first input variable group) illustrated in FIG. 17 are input to the NCLM processor 102. As a result, the set of the three input variables (the three second input variable groups) illustrated in FIG. 18 is generated. One second input variable group G1 includes one hundred and thirty-two input variables. Another second input variable group G2 includes sixty-two input variables. Another second input variable group G3 includes nine input variables.

The second input variable groups G1 and G2 each are filtered and narrowed down into a third input variable group. The second input variable group G3 is not filtered because the number of the variables already is sufficiently low. The input variables are narrowed down by using a stepwise function in the filter part 104. Thereby, the second input variable group G1 is narrowed down to twenty-two third input variable groups G4. The second input variable group G2 is narrowed down to thirteen third input variable groups G5. A first model, a second model, and a third model are generated by the model generator 106 by respectively using the third input variable groups G4, the third input variable groups G5, and the second input variable group G3.

The characteristics of the first to third models were evaluated. FIG. 19 illustrates the characteristics of the first model and the second model. The third model was discarded because the prediction accuracy was low. As illustrated in FIG. 19, $R^2$ was about 0.64 for the first model which shows that the accuracy of the first model is good. For the second model, $R^2$ is about 0.42, which is an accuracy that is slightly low but can be tolerated.

FIG. 20 is a graph illustrating the actual measured value of the output variable Y and the predicted values of the first model and the second model. In the graph of FIG. 20, the horizontal axis is a time T. In the graph of FIG. 20, an average value A of the actual measured value is shown. Also, an example of a lower limit L1 and an upper limit L2 are shown. The lower limit L1 and the upper limit L2 respectively illustrate the lower limit and the upper limit of the output variable that can be tolerated when manufacturing.

It can be seen from FIG. 20 that the first model can predict the actual measured value with higher accuracy than the second model. Although the accuracy of the second model is worse than that of the first model, the second model is not much different from the actual measured values. The first model and the second model exhibit different behaviors for the fluctuation of the actual measured value.

At a time T126, the actual measured value is between the lower limit L1 and the upper limit L2; but the predicted value of the first model has fallen below the lower limit L1. Therefore, for a prediction using only the first model, a mistaken determination may be performed if the output predicted at the time T126 is in an intolerable range. On the other hand, the predicted value of the second model is between the lower limit L1 and the upper limit L2. Therefore, for the predicted value at the time T126, it is possible to perform a correct determination by generating more models and by calculating the overall soundness of the model group.

Figure 21:
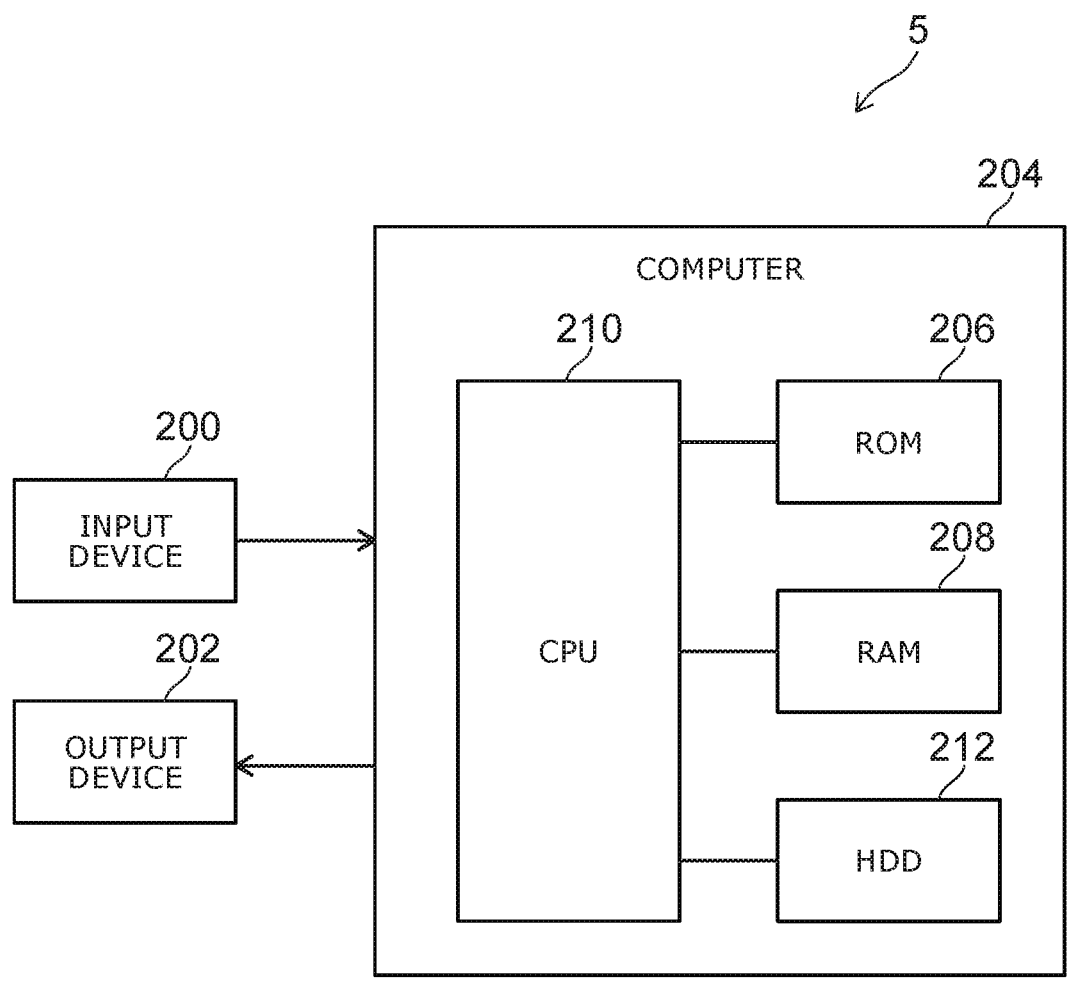
FIG. 21 is a block diagram illustrating the configuration of a model generation device for realizing the model generation systems according to the embodiments.

FIG. 21 is a block diagram illustrating the configuration of a model generation device 5 for realizing the model generation systems according to the embodiments.

The model generation device 5 includes, for example, an input device 200, an output device 202, and a computer 204. The computer 204 includes, for example, ROM (Read Only Memory) 206, RAM (Random Access Memory) 208, a CPU (Central Processing Unit) 210, and a memory device HDD (Hard Disk Drive) 212.

The input device 200 is for a user inputting information to the model generation device 5. The input device 200 is a keyboard, a touch panel, etc.

The output device 202 is for outputting the output result obtained by the model generation system 1 to the user. The output device 202 is a display, a printer, etc.

The ROM 206 stores a program controlling the operations of the model generation device 5. The ROM 206 stores a program necessary for causing the computer 204 to function as the acquirer 100, the NCLM processor 102, the filter part 104, the model generator 106, the model information storer 108, the variable narrow-down part 110, the determiner 112, the soundness calculator 114, and the external outputter 116 illustrated in FIG. 1.

The RAM 208 functions as a memory region where the program stored in the ROM 206 is loaded. The CPU 210 reads the control program stored in the ROM 206 and controls the operations of the computer 204 according to the control program. The CPU 210 loads, into the RAM 208, various data obtained by the operations of the computer 204.

The HDD 212 stores the specified number database 120 and the variable database 122 illustrated in FIG. 1. The HDD 212 functions as the model information storer 108 that stores the generated models and the calculated similarities.

The embodiments may include the following configurations and the following method.

Configuration 1

A model generation system, comprising:

a NCLM processor generating a plurality of second input variable groups from a first input variable group by selecting using the Nearest Correlation Louvain Method (NCLM), the first input variable group including a plurality of input variables;

a filter part respectively narrowing down the plurality of second input variable groups to a plurality of third input variable groups satisfying a prescribed condition;

a model generator generating a plurality of models of relationships between an output variable and each of the plurality of third input variable groups; and a soundness calculator calculating an overall soundness of the plurality of models and a soundness of each of the models.

Configuration 2

The system according to configuration 1, further comprising an external outputter outputting, to the outside, the soundness of each of the models, the output variable of each of the models, and the overall soundness.

Method 1

A model generation method comprising:

a first step of narrowing down a first input variable group to a second input variable group selected using the Nearest Correlation Louvain Method (NCLM), the first input variable group including a plurality of input variables;

a second step of narrowing down the second input variable group to a third input variable group satisfying a prescribed condition;

a third step of generating a model of a relationship between the third input variable group and an output variable; and a fourth step of narrowing down the first input variable group to the input variables not used in the generation of the model in the third step, the method further comprising:

repeating, until the number of the generated models reaches a specified number, the first step to the fourth step based on the first input variable group narrowed down in the fourth step; and a fifth step of calculating an overall soundness of the specified number of the models and calculating a soundness of each of the models.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A model generation system, comprising:
a NCLM processor narrowing down a first input variable group to a second input variable group selected using a Nearest Correlation Louvain Method (NCLM), the first input variable group including a plurality of input variables;
a filter part narrowing down the second input variable group to a third input variable group satisfying a prescribed condition;
a model generator generating a model of a relationship between the third input variable group and an output variable;
a variable narrow-down part narrowing down the first input variable group to one or more of the input variables not used in the generation of the model;
a determiner determining whether or not the number of the generated models has reached a specified number, and in the case where the number of the models has not reached the specified number, the determiner outputting to the NCLM processor the first input variable group narrowed down by the variable narrow-down part; and
a soundness calculator calculating an overall soundness of the specified number of the models and calculating a soundness of each of the models.

2. The system according to claim 1, further comprising an external outputter outputting, the soundness of each of the models, the output variable of each of the models, and the overall soundness.

3. A model generation system, comprising:
a NCLM processor narrowing down a first input variable group to a second input variable group selected using the Nearest Correlation Louvain Method (NCLM), the first input variable group including a plurality of input variables;
a filter part narrowing down the second input variable group to a third input variable group satisfying a prescribed condition;
a model generator generating a model of a relationship between the third input variable group and an output variable;
a variable narrow-down part narrowing down the second input variable group to one or more of the input variables not used in the generation of the model;
a determiner determining whether or not the number of the generated models has reached a specified number, and in the case where the number of the models has not reached the specified number, the determiner outputting to the filter part the second input variable group narrowed down by the variable narrow-down part; and
a soundness calculator calculating an overall soundness of the specified number of the models and calculating a soundness of each of the models.

4. The system according to claim 3, further comprising an external outputter outputting the soundness of each of the models, the output variable of each of the models, and the overall soundness.

5. A model generation system, comprising:
a NCLM processor narrowing down a first input variable group to a second input variable group selected using the Nearest Correlation Louvain Method (NCLM), the first input variable group including a plurality of input variables;
a filter part narrowing down the second input variable group to a third input variable group satisfying a prescribed condition;
a model generator generating a model of a relationship between the third input variable group and an output variable;
a variable narrow-down part narrowing down the first input variable group to one or more of the input variables not used in the generation of the model;
a determiner determining whether or not the number of the generated models has reached a specified number, and in the case where the number of the models has not reached the specified number, the determiner outputting, as the second input variable group to the filter part, the first input variable group narrowed down by the variable narrow-down part; and
a soundness calculator calculating an overall soundness of the specified number of the models and calculating a soundness of each of the models.

6. The system according to claim 5, further comprising an external outputter outputting the soundness of each of the models, the output variable of each of the models, and the overall soundness.

* * * * *